United States Patent [19]

Sundqvist

[11] 3,942,805

[45] Mar. 9, 1976

[54] FRICTIONLESS SEALING OPERATED BY PRESSURE MEDIUM

[75] Inventor: Yngve Bertil Sundqvist, Partille, Sweden

[73] Assignee: SKF Industrial Trading and Development Company B-V., Jutphaas, Netherlands

[22] Filed: Dec. 20, 1973

[21] Appl. No.: 426,778

[30] Foreign Application Priority Data

Dec. 22, 1972 Sweden............................ 16856/72

[52] U.S. Cl. ............. 277/75; 277/177; 277/206 A; 277/209
[51] Int. Cl............................................. F16j 15/40
[58] Field of Search............. 277/75, 81 R, 83, 173, 277/215, 135 J, 34.6, 34.3, 34, 174, 177, 207, 207 A, 207 B, 208, 209, 210, 211, 206 A

[56] References Cited
UNITED STATES PATENTS

| | | | |
|---|---|---|---|
| 3,047,299 | 7/1962 | Karsten.................................. | 277/75 |
| 3,815,926 | 6/1974 | Vore...................................... | 277/75 |

FOREIGN PATENTS OR APPLICATIONS

| | | | |
|---|---|---|---|
| 554,331 | 6/1943 | United Kingdom................... | 277/75 |

Primary Examiner—Richard E. Aegerter
Assistant Examiner—L. Footland
Attorney, Agent, or Firm—Daniel M. Rosen

[57] ABSTRACT

A sealing ring for sealing between a stationary first member and a second member coaxially rotatable in relation to said first member and having a rotationally symmetric surface zone. The sealing ring is adapted for stationary attachment relative to said first member and elastically deformable at its portion located closest to said second member. The sealing ring further includes two annular surface portions provided in spaced relationship to each other along said portion, said surface portions during absence of external actuation sealingly abutting the rotationally symmetric surface zone on said second member and having between themselves an intermediate annular groove, into which open a plurality of channels. The channels supply a pressure medium to a space defined by said second member and the walls of said groove and build up in said space a pressure such that between each annular surface portion and the rotationally symmetric zone on the second member a narrow annular gap is formed, through which the pressure medium can leak out to the ambient. A plurality of partition walls extend from the bottom of the groove up to the level of the annular surface portions and transversely across the groove from one annular surface portion to the other, thereby dividing the annular intermediate groove into a corresponding number of groove sections separated from each other, at least one channel opening into each such groove section, so that upon co-action of the sealing ring with said second member each groove section constitutes a separate pressure chamber.

20 Claims, 10 Drawing Figures

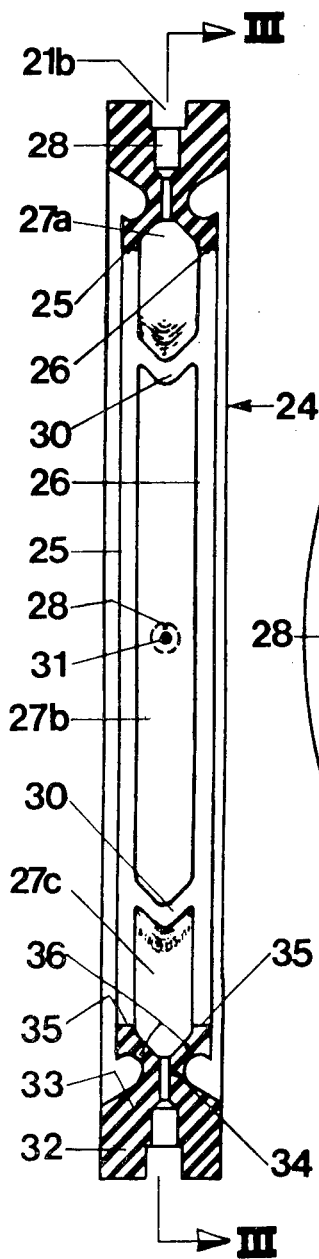
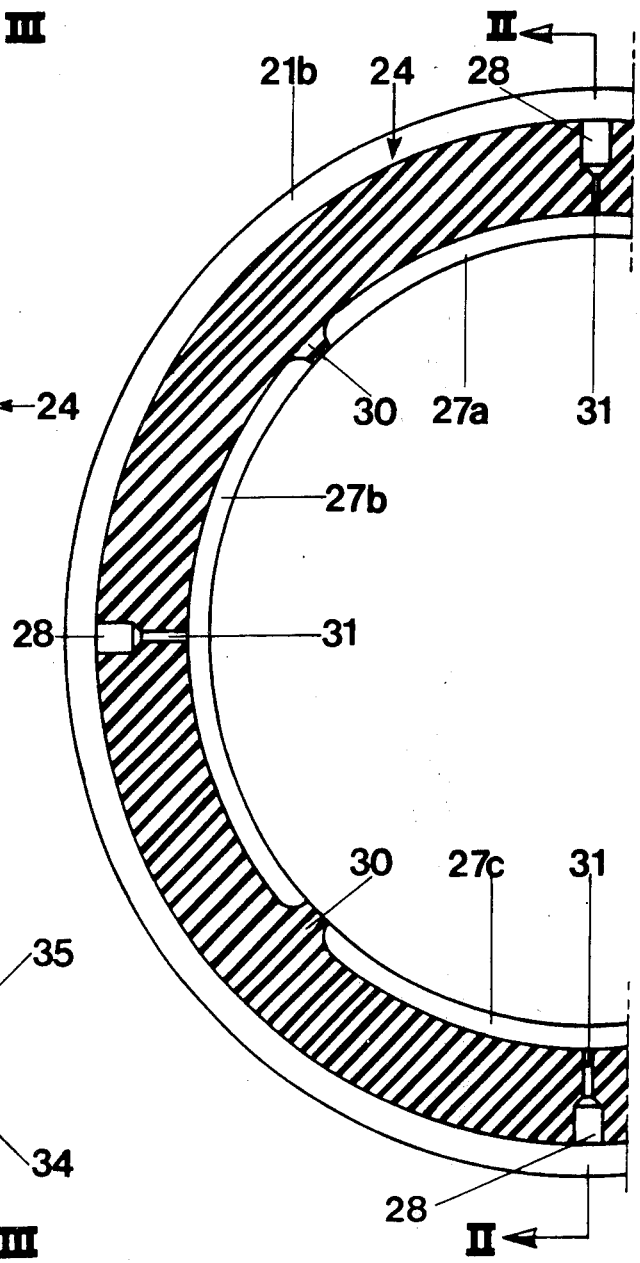

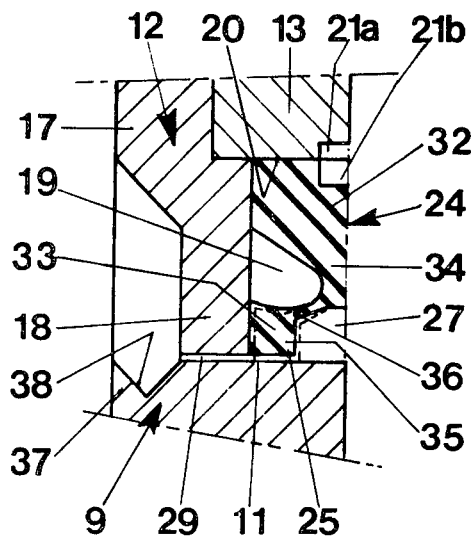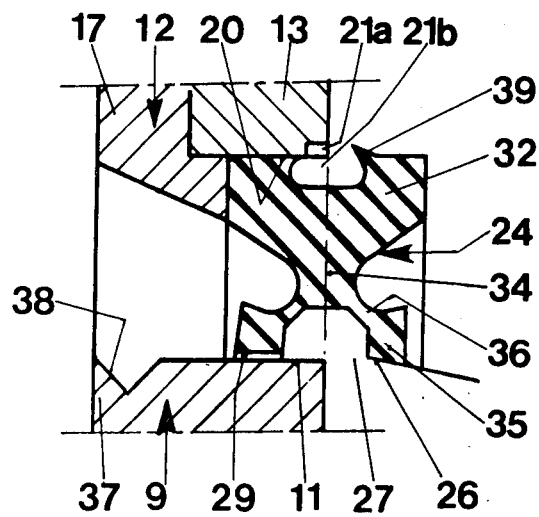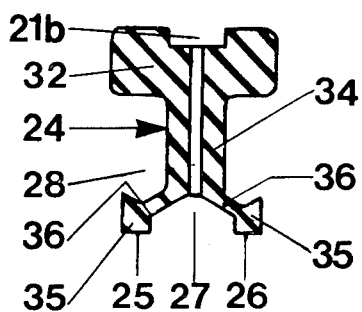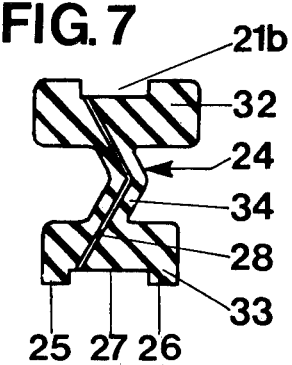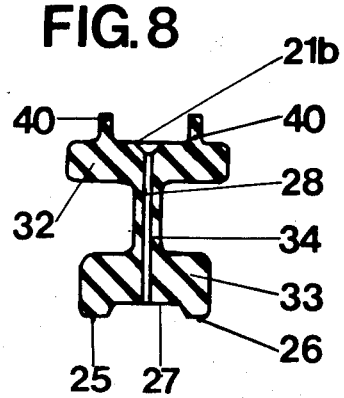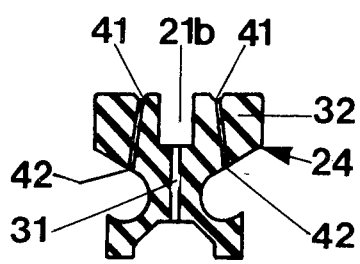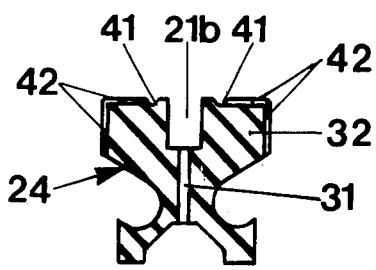

FRICTIONLESS SEALING OPERATED BY PRESSURE MEDIUM

This invention relates to sealing ring 9 kind.

With a sealing ring, such as is described in the Swedish Laid Open Specification No. 356,112, a good sealing effect can theoretically be achieved when the coaxially rotary second member, for example a shaft, is stationary as well as when it rotates at a high number of revolutions and at a high peripheral speed, for example about 15 m/s. The fact is that the sealing ring abuts the shaft when no pressure medium is supplied to the internal groove of the sealing ring, and upon pressure medium supply the two annular sealing surfaces of the sealing ring are lifted off the shaft and thereby form at each such sealing surface a narrow annular gap, through which the pressure medium leaks out to the ambient, at the same time as it prevents the entry of detrimental substances, for example solid impurities and water droplets. Such a sealing is said to be "frictionless", and it is insensitive to warping and unevenesses, for example scratches, of the coaxially rotary second member. It was found difficult, however, so to design the sealing ring that it is really lifted from the shaft about its entire circumference without an unreasonably high consumption of pressure medium. A typical sealing construction contemplates a sealing ring for sealing between a stationary first member and a second member coaxially rotatable in relation to said first member and having a rotationally symmetric surface zone. The sealing ring is adapted for stationary attachment relative to said first member and elastically deformable at its portion located closest to said second member. The sealing ring further includes two annular surface portions provided in spaced relationship to each other along said portion, said surface portions during absence of external actuation sealingly abutting the rotationally symmetric surface zone on said second member and having between themselves an intermediate annular groove, into which open a plurality of channels. The channels supply a pressure medium to a space defined by said second member and the walls of said groove and build up in said space a pressure such that between each annular surface portion and the rotationally symmetric zone on the second member a narrow annular gap is formed, through which the pressure medium can leak out to the ambient.

The problem of circumferential lift is solved, with the seal construction as described above, in accordance with the invention, by providing a plurality of partition walls extending from the bottom of the groove up to the level of the annular surface portions and transversely across the groove from one annular surface portion to the other, thereby dividing the annular intermediate groove into a corresponding number of groove sections separated from each other, at least one channel opening into each such groove section, so that upon coaction of the sealing ring with said second member each groove section constitutes a separate pressure chamber.

The invention will be described in greater detail with reference to the accompanying drawings, wherein:

FIG. 1 is a partial longitudinal section through a part of a grinding machine and shows a preferred embodiment of the sealing ring built in.

FIG. 2 is a section through the sealing ring in FIG. 1, on an enlarged scale and taken along the line II—II in FIG. 3.

FIG. 3 is a section along the line III—III in FIG. 2.

FIGS. 4 and 5 show two alternative applications of the sealing ring and two alternative embodiments of said ring.

FIGS. 6, 7, 8, 9 and 10 show five additional alternative profiles for the sealing ring according to the invention.

Figure 1:
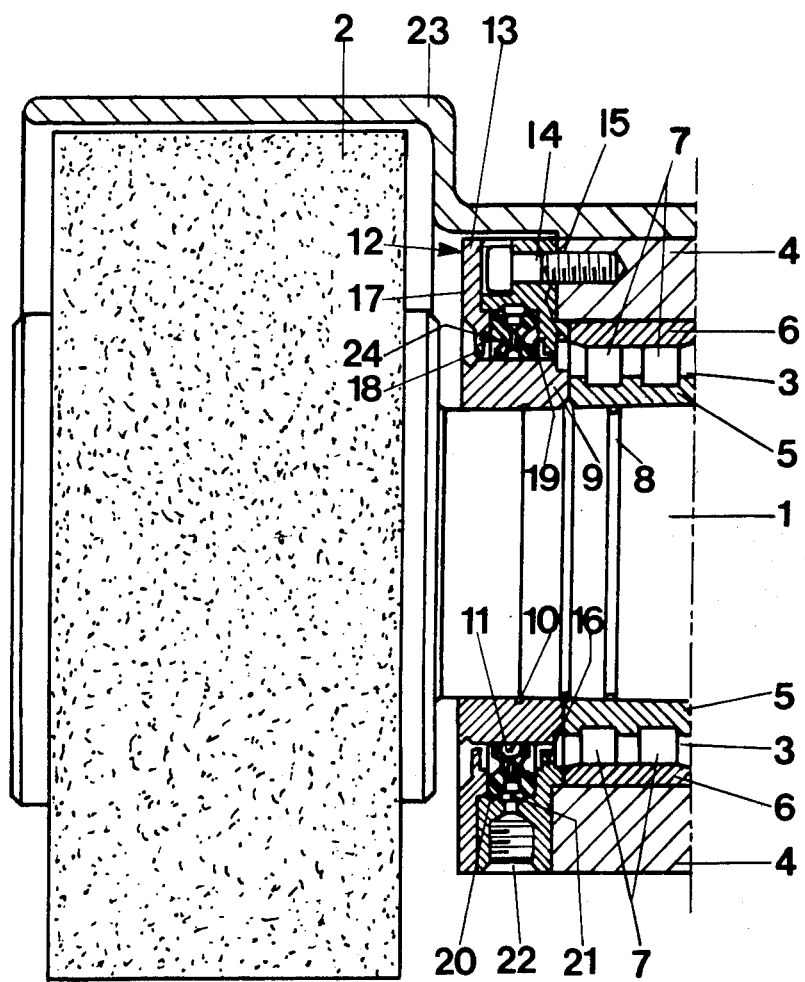

FIG. 1 shows a shaft 1 with a grinding wheel 2 mounted thereon. The shaft 1 is supported rotatably by means of bearings 3, of which one is shown, in a stationary housing 4, which carries a protective casing 23 extending over the grinding wheel 2. The bearing shown is a double row roller bearing comprising an inner ring 5 shrunk onto the shaft 1, an outer ring 6 secured in the housing, and two rows of cylindric rollers 7. The shaft, however may, of course, also be supported in other rolling bearings or in hydrostatic bearings. The shaft bore of the inner ring 5 and also the corresponding zone on the shaft 1 are slightly conical, and the shaft is provided in said zone with an annular oil distribution groove 8 for dismounting the inner ring 5 by means of pressurized oil. A step sleeve 9 is mounted on the shaft 1, which also is provided with a step, and with one end surface abutting one end surface of the inner ring 5 so as to fix the inner ring 5 in axial direction. The step sleeve 9 has on its inside an oil distribution groove 10 for mounting and dismounting by means of pressurized oil. The step sleeve 9 further has on its outside a rotationally symmetric surface zone 11, which in the embodiment shown is circular-cylindric. An axially two-part annular cover 12 is mounted on the housing 4. The axially inner part 13 of the cover 12 is secured to the housing 4 by a number of screws 14, one of which is shown, and has a collar 15 axially supporting the outer ring 6 of the bearing, and a radially inward directed flange 16, the inner periphery of which together with the step sleeve 9 forms a non-rubbing seal. The axially outer cover part 17 is secured to the inner part 13 by a number of screws (not shown) and has also with a radially inward directed flange 18, which together with the step sleeve 9 forms a second non-rubbing seal. In the cover 12, furthermore, an annular inner groove 19 is provided, which in the embodiment shown has a substantially square cross-section. The side walls of the groove 19 are formed by the flanges 16 and 18, and the groove bottom 20 is formed by a circular-cylindric surface portion of the inner cover part 13. Centrally in the groove bottom 20 an annular distribution channel 21a is provided. An inlet channel 22 for a pressure medium, such as clean pressurized air or pressurized oil, extends radially through the inner cover part and opens into said distribution channel 21a. A sealing ring 24 according to the invention, with its dimensions adapted to those of the groove, is mounted stationary in said annular cover groove 19. The dimensions of the sealing ring preferably comply with a valid standard, for example SMS 2290, but also other dimensions beyond the range for the standard are fully applicable.

In this embodiment, thus, the housing 4 and the cover 12 form a stationary first member, while the shaft 1 and step sleeve 9 form a second member, which is coaxially rotatable with a high number of revolutions relative to said first member.

The sealing ring 24 is elastically expandable in its portion located closest to the second member, i.e. in the present embodiment at its inner periphery, and it has, as appears most clearly from FIG. 2, two annular surface portions 25 and 26 in spaced relationship to each other along its inner periphery, which portions during the absence of external actuation — i.e. when pressure medium is not fed continuously through the inlet channel in the cover 12 — sealingly abut the rotationally symmetric surface zone 11 on the step sleeve 9 mounted on the shaft 1. Between the two annular surface portions 25 and 26 an intermediate annular groove 27 is disposed, and into said groove open a plurality of channels 28, which pass pressure medium from the distribution channel 21, which is defined by the bottom 20 of the cover groove 19 and the sealing ring 24, into a space, which is defined by the step sleeve 9 and the walls of the sealing ring groove 27. A pressure is thereby built up in said space such that the inner diameter of the sealing ring 24 increases to such an extent, that between each of the annular surface portions 25 and 26 and the rotationally symmetric zone 11 on the step sleeve 9 a narrow annular gap 29 is formed, through which the pressure medium can leak out to the ambient. The gap has normally a width of a few $\mu$m up to a few hundred $\mu$m, depending primarily on the surface finish of the zone 11 and the pressure medium used and the pressure applied.

A plurality of partition walls 30 extend, as appears from FIGS. 2 and 3, from the bottom of the sealing ring groove 27 radially inwards to the same level as the annular surface portions 25 and 26 and transversely across the groove 27 from one annular surface portion to the other. Said partition walls 30 divide the groove 27 into a corresponding number of separate groove sections, of which three — 27a, b and c — are shown in FIGS. 2 and 3. At least one of said channels 28 open into each of said groove sections Thereby when the sealing ring 24 is placed on the step sleeve 9, each groove section forms a separate pressure chamber.

In order to make each groove section or pressure chamber give the same effect as the other ones, they must be of equal size, i.e. the partition walls 30 must be equidistantly spaced along the length of the sealing ring groove 27. For operating in a perfect manner, however, the arrangement must be such that the ring 24 is centered relative to the step sleeve 9 mounted on the rotary shaft 1. Each channel 28, therefore, should preferably include a built-in flow-restrictor 31, so that the pressure is substantially equal in all pressure chambers, whereby the sealing ring 24 will be self-centering relative to the step sleeve 9. Said flow restrictor 31 preferably is a channel portion having a reduced cross-sectional area, but also special throttle plates or other flow-restricting members may be mounted in the channels 28.

In order to reduce the consumption of pressure medium, the width of the annular gap 29 should be held as small as possible. When the inner peripheral portions of the sealing ring 24 are very weak, the gap width may in some cases vary along the pressure chamber. It is, therefore, suitable to arrange the channel 28 so as to open centrally into the pressure chamber. An additional improvement is obtained by shortening the extension of the pressure chamber in its longitudinal direction. The sealing ring 24, thus, should always include at least three, preferably four pressure chambers at small and relatively moderate diameters of the sealing ring groove 27. In cases of large outer diameters, however, it is preferred to case sealing rings with still more pressure chambers.

In order to prevent the partition walls 30 from deteriorating the flexibility of the sealing ring 24 in its elastically expandable portion, i.e., — at the present embodiment in its inner circumferential portion, at least pointwise, the partition walls preferably should have a nonstraight extension between the annular surface portions 25 and 26. Each partition wall 30 preferably should have a form resembling an open V, as shown in FIG. 2.

In the embodiment of the sealing ring 24 shown in FIGS. 2 and 3, furthermore, a distribution channel 21b corresponding to the distributional channel 21a of the cover 12 is provided in a surface of the sealing ring 24 having an orientation opposed to that of the annular surface portions 25 and 26, and the channels 28 extend from the distribution channel 21b to the pressure chambers. Said distribution channels 21a and b are located directly in front of each other and together form a distribution channel 21 with such a cross-sectional area that the pressure medium can flow therethrough relatively unimpeded. To improve economy, it may be further suitable to manufacture the entire sealing ring as an integrated unit and of rubber-elastic material, and preferably the entire distribution channel 21 should be placed into the sealing ring and no part of it into the cover 12. This latter step, however, can be taken only in certain cases, because a distribution channel sufficiently dimensioned and placed in the outer circumferential portion of the rubber sealing ring can have the effect that this portion will be too weak. It is, of course, fully possible to place the entire distribution channel 21 into the cover 12, if there is sufficient space, but this involves increased machining costs.

Comparing the profile for the sealing ring in FIG. 2 with the profiles for the sealing rings in FIGS. 4–8, it is noted that all have a basic cross-section resembling that of an I-beam with a relatively rigid and thick supporting flange 32, a sealing flange 33 and a web 34 connecting said flanges. Also, the possible distribution channel 21b is provided in the supporting flange 32, the groove 27 with its sections constituting pressure chambers is arranged in the sealing flange 33, and the channels 28 extend at least through the supporting flange 32 and the web 34. In the embodiments shown, the supporting flange 32 may also be called outer flange, and the sealing flange 33 be called inner flange. A common feature is also that the sealing flange 33 has a smaller width than the supporting flange 32 in order to prevent the sealing flange upon actuation by the pressure medium from coming unintentionally into contact with the sides of the cover groove 19 and thereby possibly be inclined. A still more improved safety against such an event will be obtained if the side walls of the cover groove 19 in the zone closest to the step sleeve 9 are provided with annular recesses, as shown in FIG. 1.

In a preferred embodiment of the sealing ring according to the invention, as shown in FIGS. 2 and 4–6, the web 34 is relatively rigid and the sealing flange 33 relatively weak. The sealing flange 33, furthermore, consists of two rings 35 with substantially square cross-section and weak collar 36, which projects substantially diagonally from each such ring 35 and connects the ring 35 with the web 34. The rings 35 are located one on each side of the groove sections 27a, b anc c, and they have surfaces, in the shown embodiments inner peripheral surfaces, which constitute said two annular surface portions 25 and 26 of the sealing ring. Said surface portions are suitably in their entirety disposed substantially in alignment with each other. In the embodiments shown, said portions are substantially cylindrical, each having an axial width, which corresponds to about one-fifth of the axial width of the sealing ring. This increases the possibilities of attaining the desired mode of operation of the sealing ring.

The flexibility of the sealing ring 33, thus, is based substantially on the weak collars 36, while the rings 35 are more rigid in order to reduce the variations in the width of the annular gap 29. In the embodiments shown, the stability of the rings 35 is improved still more when their axial end surfaces are slightly extended radially outwards. Thereby the outer peripheral surfaces of the rings 35 will be inclined somewhat inwards towards the weak collars 36. This can be utilized, if desired, for attaching a garter spring (not shown) about each ring 35.

For providing the supporting flange 32 with the desired rigidity properties, the thickness of the supporting flange, as shown in FIGS. 2, 4 and 5, can be increased in a direction inwards towards the web 34, which is given a low height. The resulting profile of the sealing ring shows great similarities with an X. It is, however, also possible, as shown in the FIGS. 7 and 8, to make the I-profile more pronounced by forming also the sealing flange 33 relatively rigid and thick and placing the weak portion of the sealing ring in the web 34. The desired weakness of the web can be achieved by giving the web a non-straight cross-section, for example in the form of an obtuse-angled V, as shown in FIG. 7, or by forming the channels along their entire length with reduced thickness, as shown in FIG. 8.

The FIGS. 6–8 show that the flow restricting throttling 31 in the channels 28 also can be obtained by forming the channels along their entire length with reduced crosssectional area.

When grinding a workpiece, the workpiece and the grinding wheel often are cooled by a water jet. As the grinding wheel many times may have a very high peripheral speed, close to or even higher than 50 m/s, the water droplets are atomized and form a fine mist surrounding the grinding machine and containing grinding dust, which must not be allowed to enter the bearings of the shaft. The pressure medium — in this case preferably clean and dry compressed air — which lifts the inner circumference of the sealing ring 24 out of contact with the step sleeve 9 mounted on the shaft 1, so that the sealing ring is frictionless, passes out through the narrow annular gaps 29 partly in a direction towards the bearing 3, where it is led off through channels (not shown), and partly towards the grinding wheel 2. In order to prevent, to the greatest possible extent, contaminated mist from entering the gap between the inner flange portion 18 of the outer cover part 17 and the step sleeve 9, in spite of the opposedly directed air stream, the outer circumference of the step sleeve is provided at the outer end surface of the sleeve with an integral flinger ring 37 and an immediately adjacent groove 38 with V-shaped cross-section, which groove is located at the outer end surface of the flange portion 18. After a long time of operation, impurities may have entered between the flange portion 18 and the sealing ring 24 in an amount such that the lifting of the inner flange of the sealing ring closest to the grinding wheel 2 is jeopardized. This problem can be avoided by applying one of the embodiments according to FIGS. 4 and 5. In the embodiment according to FIG. 4, the sealing flange or inner flange 33 of the sealing ring has been widened in axial direction so that it is only slightly narrower than the supporting or outer flange 32. Furthermore, the recess shown in FIG. 1 on the inside of the flange portion 18 has been abandoned. When pressurized air is being supplied to the sealing ring 24, the ring 35 of the inner flange 33 is lifted from its position indicated by dashed lines and, instead, brought to sealingly abut the inner surface of the flange portion 18. It is also possible in accordance with FIG. 5, to not use the flange portion 18 and make the inner circumference of the outer cover part 17 to transform continuously into the outer flange of the sealing ring 24. This increases the risk that impurities collect within said zone, but it facilitates both ocular inspection and cleaning.

FIG. 5 illustrates further two additional modifications of the sealing ring 24, which to the right in the Figure is shown in free, unloaded condition, and to the left in the Figure is shown inserted into the cover groove 19 and actuated by the pressure medium. As in certain cases the pressure medium may give rise to an initiating heeling of the ring 35 and the weak collar 36 about the attachment of the collar in the web 34, so that the width of the narrow annular gap 29 increases in axially outward direction, it may be suitable in these cases to reduce or entirely eliminate the effect of such an increase of the gap width by forming the aligning, substantially cylindric surface portions 25 and 26 so as to incline slightly inwards towards the intermediate groove 27.

The sealing ring according to FIG. 5 solves also another problem, because the ring, in order to facilitate the attainment of its intended function, must be well fixed in axial as well as radial direction. If, in the embodiments shown, the sealing ring has too loose a fit in the cover groove 19 and/or its rigid radially outer portion is too weak and/or the pressure medium during the passage through the channels 28 is being throttled too much, then the initial part of the pressure medium fed into the distribution channel 21 may exert on the sealing ring 24 such a high radially inward directed pressure, that the abutment of the ring 24 against the bottom of the cover groove 19 will be discontinued at least partially. Thereby, the pressure medium can act on a still larger surface, so that the sealing ring 24 locally or along its entire inner periphery will be pressed so forcefully against the step sleeve 9, that a frictionless state cannot be obtained. If the machine is started, with the sealing ring 24 being in this position, the ring will rapidly be worn out. This risk is eliminated by providing in the transition between the outer peripheral surface of the sealing ring 24 and the side walls of the distribution channel 21b a sealing lip 39, which projects over a part of the width of the distribution channel and projects somewhat from the rest of the outer peripheral surface of the sealing ring body. A variant of this idea is shown in FIG. 8, according to which two parallelly extending sealing lips 40 project radially from the outer periphery of the outer flange 32 and from between themselves the distribution channel 21b.

It is also possible, instead of providing the supporting flange 32 with sealing lips 39 or 40, to apply the principle illustrated in FIGS. 9 and 10. The profiles according to these Figures differ from those discussed above, in that the distribution channel 21b is considerably deeper and narrower, so that the pressure of the pressure medium upstream the flow restrictors 31 normally will act on a smaller zone, and in that a channel system for draining is provided on both sides of the distribution channel 21b. In the embodiment according to FIG. 9, the draining system comprises an annular draining groove 41 in the outer peripheral surface of the sealing ring on each side of and within a short distance from the distribution channel 21b, and a plurality of draining channels 42 extending substantially radially from the draining groove 41 through the outer flange 32 to its inner peripheral surface. In the embodiment according to FIG. 10, the draining channels do not pass through the outer flange 32, but extend from the draining grooves 41 in the outer peripheral surface of the outer flange 32 outward to its axial end surface and continue in said end surfaces to the inner peripheral surface of the flange. When the pressure medium exercises on the sealing ring 24 a pressure so high that a gap is formed between the ring and the bottom 20 of the cover groove 19, then the width of this gap in axial direction is limited to the distance between the draining grooves 41, because all pressure medium, which possibly may arrive at the grooves 41, is immediately drained to the ambient. This eliminates the risk that the sealing ring due to radial impression will not be frictionless during the starting moment.

The above description is to be regarded merely as examples of preferred embodiments of the sealing ring according to the invention. A great number of modifications of the invention can be imagined within the scope of the following claims. It is possible, for example, but not preferable, to make the radially outer portion of the sealing ring of metal or another rigid material and to use rubber-elastic material for the other parts of the sealing ring. It is also possible, but not preferable, to vulcanize stiffening, reinforcing or some other kind of strengthening material, for example metallic material, into the sealing ring. The profile of the sealing ring, furthermore, may be turned through 180°, and the sealing ring be fixed on a stationary shaft or the like as to seal radially against a housing or the like, which is concentrically rotatable around the shaft. The profile of the sealing ring may also be turned through 90° to being about an axial sealing ring.

What is claimed is:

1. For sealing between a stationary first member and a second member coaxially rotatable with respect to said first member, a sealing ring comprising a rotationally symmetric surface zone, said sealing ring being adapted for stationary attachment relative to said first member and elastically deformable at a portion thereof located closest to said second member, said sealing ring including two annular surface portions provided in spaced relationship to each other along said portion, said surface portions during absence of external actuation sealingly abutting the rotationally symmetric surface zone on said second member, said surface portions having between themselves an intermediate annular groove into which open a plurality of channels for supplying a pressure medium to a space defined by said second member and the walls of said annular groove, said supplying of pressure medium building up in said space a pressure such that between each of said annular surface portions and said rotationally symmetric zone on said second member a narrow annular gap is formed through which said pressure medium can leak out to the ambient, and further comprising a plurality of partition walls extending from the bottom of said annular groove up to the level of said annular surface portions and transversely across said annular groove from one annular surface portion to the other, thereby dividing said intermediate annular groove into a corresponding number of groove sections separated from each other, at least one of said channels opening into each such groove section, whereby co-action of said sealing ring with said second member results in each groove section constituting a separate pressure chamber.

2. A sealing ring as defined in claim 1 wherein said partition walls are equidistantly spaced along the length of said intermediate groove.

3. A sealing ring as defined in claim 1 wherein said partition walls, groove sections and channels are at least three, preferably four, in number when the diameter of the intermediate annular groove is small, and more in number when said diameter is large.

4. A sealing ring as defined in claim 1 wherein said partition walls have a non-linear extension between said annular surface portions.

5. A sealing ring as defined in claim 4, wherein said partition wall has a shape resembling an open V.

6. A sealing ring as defined in claim 1 wherein each channel comprises a built-in flow-restrictor for substantially equalizing the pressure in all of said separate pressure chambers.

7. A sealing ring as defined in claim 6, wherein said flow restrictor is a channel portion with a reduced crosssectional area.

8. A sealing ring as defined in claim 1 wherein said two annular surface portions extending along said portion of the sealing ring are arranged substantially in alignment with each other with a slight inclination inwards towards said intermediate groove.

9. A sealing ring as defined in claim 1 wherein an annular distribution channel, from which the said plurality of channels extend, is provided in a surface of the sealing ring with opposed orientation in relation to the annular surface portions and said intermediate groove.

10. A sealing ring as defined in claim 9, wherein a sealing lip is provided in the transition between said opposedly oriented surface of the sealing ring and the side wall of said distribution channel, said lip projecting over part of the width of said distribution channel and projecting somewhat outwards from the rest of the opposedly oriented surface of the sealing ring.

11. A sealing ring as defined in claim 9, wherein an annular draining groove is provided in said opposedly oriented surface of the sealing ring on both sides of the distribution channel, and that a plurality of draining channels extend from said draining groove to the ambient.

12. A sealing ring as defined in claim 1 wherein one single channel of said plurality of channels extends into each separate pressure chamber, and opens centrally thereinto.

13. A sealing ring as defined in claim 1 and having a basic cross-section resembling that of an I-girder with a relatively rigid and thick supporting flange adapted to be attached to the first member, a sealing flange intended to co-act with said second member, and a web connecting the flanges, said groove sections being provided in the sealing flange and said channels extending through the supporting flange and the web.

14. A sealing ring as defined in claim 13, wherein said sealing flange has a somewhat smaller axial width than the supporting flange.

15. A sealing ring as defined in claim 13 wherein said web is relatively rigid and the sealing flange relatively weak, and said sealing flange consists of two rings of substantially square cross-section, which rings are located one on each side of the groove sections and have surfaces constituting said two annular surface portions of the sealing ring, and that from each substantially square ring projects substantially diagonally a weak collar connecting the substantially square ring to the web.

16. A sealing ring as defined in claim 15, wherein the thickness of the supporting flange increases in the direction inwards towards the web, which has a low height.

17. A sealing ring as defined in claim 13 wherein said sealing flange is relatively rigid and thick, and that said web is weak.

18. A sealing ring as defined in claim 17, wherein said web has a non-linear cross-section, preferably in the form of an obtuse-angled V.

19. A sealing ring as defined in claim 17, wherein two parallel sealing lips project from that side of the supporting flange which is oppositely located in relation to the web.

20. A sealing ring as defined in claim 1, characterized in that it consists of rubber-elastic material.

* * * * *

UNITED STATES PATENT AND TRADEMARK OFFICE
CERTIFICATE OF CORRECTION

PATENT NO. : 3,942,805
DATED : March 9, 1976
INVENTOR(S) : Yngve Bertil Sundqvist It is certified that error appears in the above-identified patent and that said Letters Patent are hereby corrected as shown below:

Column 1, line 5, delete "kind".

Column 4, line 1, delete "large" and substitute --larger--.

Column 5, line 33, delete " channels along their entire length " and substitute --web certainly straight, but--.

Column 6, line 6, delete "has been abandoned" and substitute --is not used here--.

Column 7, line 41, before " as " insert --so--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*